Feb. 13, 1968  W. K. WASDELL  3,368,650
SEAL MEANS FOR SHOCK ABSORBERS
Filed Feb. 25, 1966  4 Sheets-Sheet 1
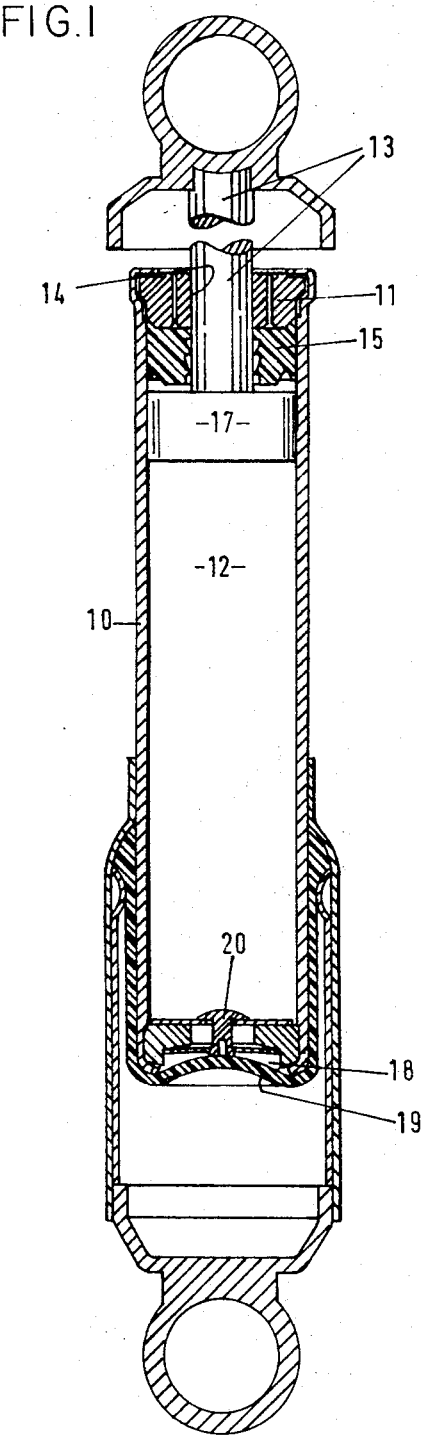
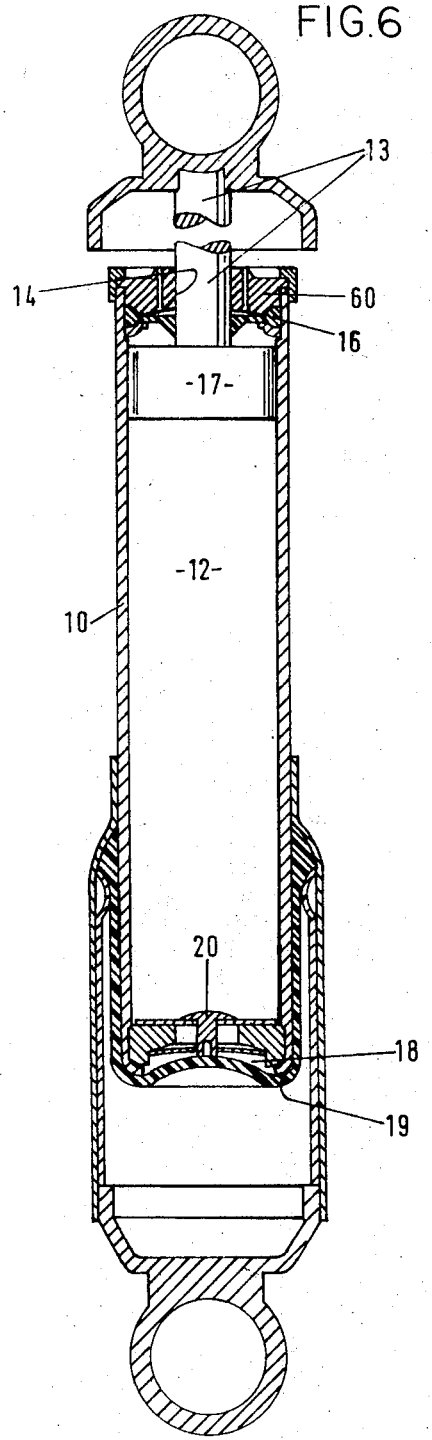
INVENTOR
WILLIAM KENNETH WASDELL
By: Norris + Bateman Attys Feb. 13, 1968   W. K. WASDELL   3,368,650
SEAL MEANS FOR SHOCK ABSORBERS
Filed Feb. 25, 1966   4 Sheets-Sheet 2

INVENTOR
WILLIAM KENNETH WASDELL
By: Norris + Bateman, Attys

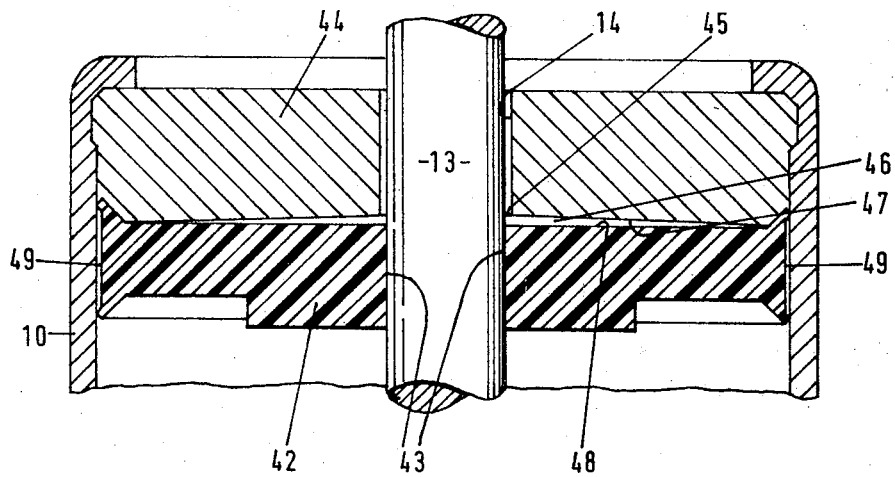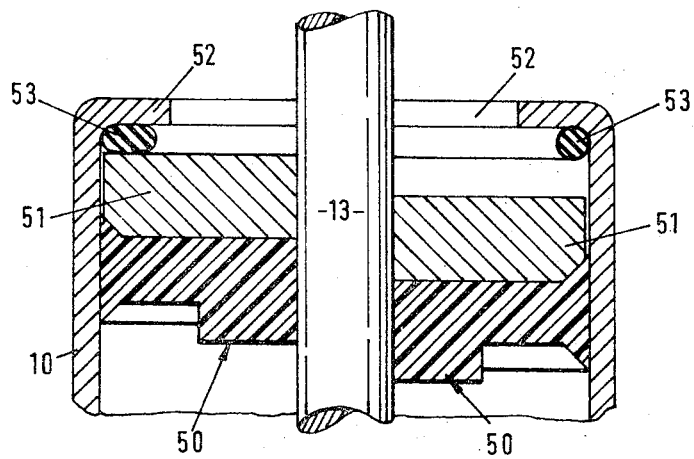

United States Patent Office 3,368,650
Patented Feb. 13, 1968

3,368,650
SEAL MEANS FOR SHOCK ABSORBERS
William Kenneth Wasdell, Thimble End Farm,
Oxleys Road, Warwickshire, Wishaw, Sutton,
Coldfield, England
Filed Feb. 25, 1966, Ser. No. 530,016
Claims priority, application Great Britain, Mar. 24, 1965,
12,390/65, 12,391/65
15 Claims. (Cl. 188—100)

ABSTRACT OF THE DISCLOSURE

A single tube shock absorber comprises a body having a cylindrical internal wall defining a cylindrical working chamber for a liquid damping medium, a cap is fixed or slidably mounted on said body to close one end of said chamber, a piston is disposed in axial sliding engagement with the cylindrical wall of the working chamber, and a piston rod is fixed to the piston and extends through an annular seal element disposed within the working chamber and through an aperture in the cap. The seal element has a radially outermost surface in sealing engagement with the cylindrical wall of the working chamber and a radially innermost surface in axial sliding engagement with the piston rod to create a liquid tight seal between the body and piston rod. A recuperation chamber is provided in communication with the working chamber on the opposite side of the piston from the cap through a valve permitting liquid medium displaced by the piston rod to pass into the recuperation chamber at a restricted rate and comparitively free return of the liquid from the recuperation chamber to the working chamber. The shock absorber of the invention is characterized in that the radially outermost surface of said seal element has axially inwardly unlimited sliding engagement with the same uninterrupted cylindrical wall as the piston and cooperating means is provided for introducing atmospheric pressure into the body to act on the axially outermost portion of the seal element to cause the entire seal element to slide axially inwardly within the working chamber when liquid pressure within the working chamber is less than atmospheric pressure. This latter means preferably comprises a passing through an axially fixed cap on the body.

---

This invention relates to shock absorbers or vibration dampers of the kind, hereinafter referred to collectively as "shock absorbers of the kind described," commonly known as direct acting telescopic shock absorbers and comprising an internally cylindrical body, a cap closing one end of the body interior, and defining with said interior a working chamber to be filled with a liquid damping medium, a piston rod entering the working chamber through a guide aperture in the cap and sealed to the wall of the working chamber by an annular seal element, a piston slidably accommodated in the working chamber and fixed to the piston rod for reciprocal motion therewith along the working chamber, valved openings through the piston, and a recuperation chamber connected to the working chamber on the opposite side of the piston to the cap through a valve permitting liquid medium displaced by the piston rod to pass into the recuperation chamber at a restricted rate and permitting comparatively free return of liquid medium into the working chamber from the recuperation chamber principally to compensate for the variable desplacement of the piston rod and heat expansion of the liquid.

Shock absorbers of the kind described have been found in practice to suffer from aeration, i.e., air in the working chamber, with adverse effects on the performance of the shock absorber. This aeration takes place by ingress of air from outside the shock absorber past the seal element when the pressure in the liquid medium between the piston and the cap is less than that of the atmosphere. This condition of negative pressure differential across the seal element is believeed to take place when one or more of the shock absorber valves, particularly the valve to the recuperation chamber, is temporarily or partly inoperative, for example by reason of being held open by a solid particle in the liquid medium or by high speed operation, especially at a high temperature.

It has been proposed to eliminate aeration by designing the seal element positively to exclude air from the working chamber, even if the latter is in a vacuum state adjacent the seal element, but such seal elements have proved unsatisfactory because the high pressure contact needed between the seal element and the piston rod produces high frictional resistance to movement of the piston rod through the seal element.

It is an object of the invention to provide a shock absorber of the kind described in which aeration is substantially eliminated without the production of high frictional resistance to movement of the piston rod through the seal element.

In accordance with the invention, in a shock absorber of the kind described means are provided for transmitting atmospheric pressure to the radially innermost portion at least of the seal element, the radially innermost portion at least of the seal element being axially slidable within the working chamber under the resultant force produced by the opposed pressures exerted on the seal element by the atmosphere and the liquid medium.

Preferably, the whole of the seal element is axially slidable within the working chamber; alternatively the radially outermost portion of the seal element is fixed in position relative to the body of the shock absorber, and the radially innermost portion of the seal element is capable of limited resilient axial movement relative to the radially outermost portion of the seal element.

Typical examples and modifications thereof of the practical realisation of the invention will now be particularly described with reference to the accompanying drawings, in which:

FIGURE 1 is a sectional elevation of a complete shock absorber;

FIGURES 3, 4 and 5 are further detail views similar to FIGURE 2 but showing modified seal elements;

FIGURE 6 is a view similar to FIGURE 1, but showing another modified seal element

Figure 2:
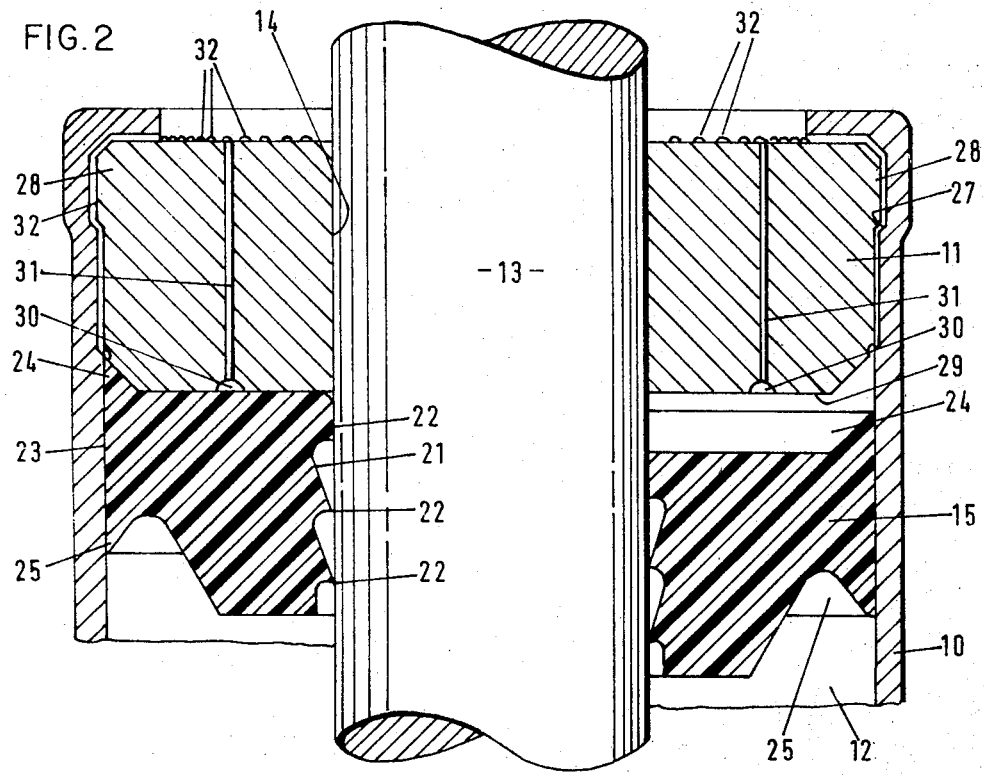
FIGURE 2 is a detail of FIG. 1 on a larger scale.

Referring initially to FIGURES 1 and 6, in each of these figures is shown a shock absorber comprising an internally cylindrical body 10, a cap (11 or 60) closing one end of the body interior, and defining with said interior a working chamber 12 filled with a liquid damping medium such as oil.

A piston rod 13 enters the working chamber 12 through a guide aperture 14 in the cap 11 or 60, and is sealed to the wall of the working chamber through an annular seal element designated 15 in FIGURE 1 and 16 in FIGURE 6. A piston 17 is slidably accommodated in the working chamber 12 and is fixed to the piston rod 13. The piston 17 has valved openings therethrough of conventional type and therefore not shown for clarity. The shock absorber also comprises a recuperation chamber 18 having a flexible and resilient wall 19, and connected to the working chamber 12 through a valve 20 permitting liquid medium displaced by the piston rod 13 to pass into the recuperation chamber 18 above a given pressure, and permitting comparatively free return of liquid medium back into the working chamber 12.

In FIGURE 2 there is shown on a larger scale the seal element 15 and cap 11 of FIGURE 1, the seal element 15 being spaced from the cap 11 on the right hand side. The seal element 15 is annular, and its radially innermost surface 21 has a plurality of axially spaced annular lips 22 projecting radially inwardly and slidably sealing against the piston rod 13. The radially outermost surface 23 of the seal element 15 is naturally generally concave in axial cross-section, and is extended axially in two resilient and annular flanges 24 and 25 projecting away from one another and tapering to a tip of narrow width. The seal element 15 is of substantial axial thickness radially within the flanges 24 and 25 to give substantial rigidity and to cushion extreme withdrawal of the piston 17 in the chamber 12.

When the seal element 15 is installed in the shock absorber the outermost surface 23 is flattened so that annular tips of the flanges 24 and 25 bear resiliently against wall of the working chamber 12. Each tip effects sealing against pressure from its respective side of the seal element 15, such pressure acting to press the tip more rigidly against the working chamber wall.

The seal element 15 is freely housed in the working chamber 12 adjacent the cap 11. The cap 11 is held in position by radially inward peening of the end of the body 10 and by a shoulder 27 on the body wall engaged by a shallow flange 28 on the cap 11. The cap 11 has an inner surface 29 of shape complementary to the adjacent surface of the seal element 15. The inner surface 29 of the cap 11 is provided with a least one annular groove 30 surrounding but spaced from the piston rod 13, and connected to atmosphere through spaced ports 31 through the cap 11. Alternatively, or in addition, the radially inner surface of the body 10 is formed with serrations 32 which define gaps between the adjacent axially extending walls of the cap and body and hence connect the axially outermost surface of the seal element 15 to atmosphere.

In use, the working chamebr 12 is filled with oil under pressure, all air being excluded, and the seal element 15 is pressed by the oil pressure against the cap 11 as shown in FIGURE 1 and in the left hand portion of FIGURE 2. In certain circumstances during working of the shock absorber, a sub-atmospheric pressure will tend to occur in the oil between the cap 11 and the piston 17; for example should the valve 20 to the recuperation chamber 18 be held open during at least a part of the stroke of the piston 17 theretowards, or the valve-controlled openings in the piston 17 be held shut both by foreign matter, or the shock absorber be operated at such a speed and temperature that oil with low viscosity should escape into the recuperation chamber 18 before the valve 20 thereto can shut. In all these cases the seal element 15 is continuously acted upon by atmospheric pressure against its surface adjacent the cap through the ports 31 and/or the serrations 32 to cause the seal element 15 to slide bodily and axially away from the cap 11, maintaining the pressure in the oil adjacent the seal element 15 at near atmospheric; this is shown in right hand half of FIGURE 2. Thus the sub-atmospheric pressure is relieved and so air is not drawn into the working chamber 12. As soon as the sub-atmospheric pressure tendency ceases, for example when the piston 17 returns towards the seal element 15, the positive pressure differential between the pressures in the oil and atmosphere on the two sides of the seal 15 returns the seal element 15 to lie against and be supported by the cap 11. Thus aeration of the oil is avoided.

Figure 3:
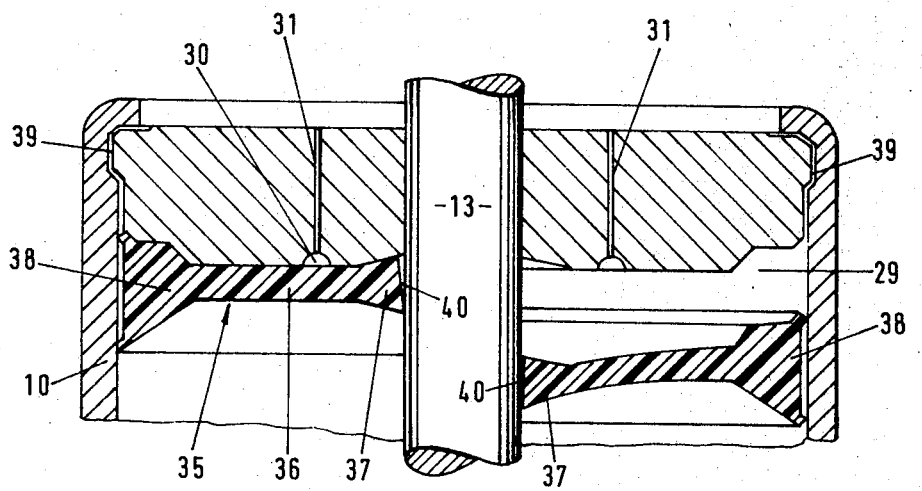

FIGURE 3 shows a modification of the seal 15 of FIGURES 1 and 2 in which a seal element 35, instead of having a substantially rigid major part, is provided with a radially intermediate resiliently flexible portion 36 whereby an inner portion 37 of the seal element 35 surrounding and adjacent the piston rod 13 is capable of resilient motion axially relative to an outer portion 38 of the seal element 35 adjacent the wall of the working chamber 12. In this modification resilient deformation of the seal element 35 is effected by small amounts of sub-atmospheric pressure adjacent the seal 35, whilst a greater degree of sub-atmospheric pressure additionally produces axial movement on the entire seal element. On the left hand side of FIGURE 3 the seal element 35 is shown in its position when there is no condition of sub-atmospheric pressure in the oil, whilst on the right hand side both resilient deformation and axial movement are shown. FIGURE 3 also shows, as an alternative to the ports 31 for the seal element 15, serrations 39 around the cap 11. Furthermore a single lip seal 40 is shown which is an alternative to the several lips 22 of FIGURE 2.

When the ports 31 and groove 30 are replaced by the serrations 32 or 39, this modification is of particular importance in relation to sliding seals which have a comparatively small radial dimension between the radially innermost and outermost parts, e.g. of the order of $5/16$ of an inch, since the need for the groove 30 in the cap surface 29, and fine holes through the cap 11, is eliminated, with consequent saving in costs in some circumstances, and with the added advantage of keeping the cap surface 29 as plain as possible to satisfactorily support the seal against the pressure of the oil.

Referring now to FIGURE 4, the seal element 42 shown therein is basically the same as the seal element 15 of FIGURES 1 and 2, but is provided with a single lip seal 43 resiliently bearing against the piston rod. In addition the radially outermost surface 49 is not completely flattened. The cap 44 is provided with an enlarged guide aperture 14 of which the inner end 45 opens into a plano-convex volume 46 between a concave inner surface 47 of the cap 44 and the naturally flat facing surface 48 of the seal element 42. When the pressure of the oil within the working chamber 12 adjacent the seal element 42 is at its normal pressure which is greater than that of the atmosphere, the seal element 42 is deformed to lie against and be satisfactorily supported by the surface 47. However, whenever the oil pressure drops to that of the atmosphere, so that the resultant pressure on the element 42 is zero, the seal element 42 takes up the position shown in FIGURE 4, with atmospheric air acting through the guide aperture 14 into the volume 46 and upon substantially the whole of the surface 48 of the element 42. As soon as the oil pressure drops significantly below that of the atmosphere, the seal element 42 will then move bodily to maintain the oil pressure close to that of the atmosphere, and so prevent air from beign drawn into the working chamber 12.

FIGURE 5 shows another method of transmitting atmospheric pressure to the seal element 50, the left hand side of the figure showing the seal element 50 and the cap 51 in their normal position, and the right hand side showing the situation caused by sub-atmospheric pressure in the oil adjacent the seal element 50. In this modification the atmospheric pressure acting on the cap 51 can cause the cap 51 and element 50 both to move inwardly. The cap 51 is prevented from escaping from the body by the inturned flange 52, and has its upward movement cushioned by an O-ring 53 seated below the flange 52.

Figure 7:
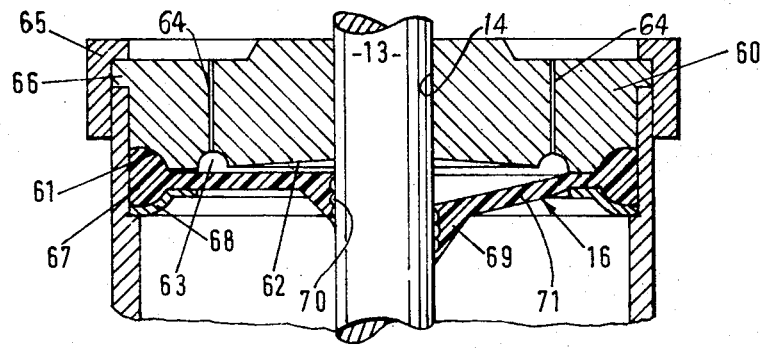
FIGURES 7, 8 and 9 are detail views similar to FIGURE 2 but showing other modified seal elements.

Referring to FIGURES 6 and 7, the left hand side of FIGURE 7 shows the seal element 16 in a position in which there is no resultant pressure on the seal element 16, and the right hand side shows the condition effected by sub-atmospheric pressure.

With particular reference to FIGURE 7, the cap 60 is formed, inwardly of an axially extending annular recess 61, with a generally convex surface 62 which is nearly flat and is interrupted by an annular groove 63 surrounding and spaced from the guide aperture 14. The groove 63 is connected to atmosphere through a plurality of spaced ports 64. A flange 66 on the cap 60 is forced, by means of a ring nut 65, against the end of the body so that the continuous radially outermost portion 67 of the seal element 16 is trapped as an oil- and air-tight joint against the wall of the working chamber 12 between the recess 61 and a rigid washer 68. The seal element 16 has a continuous radially innermost portion 69 of which the radially inner axially-extending surface 70 is provided with a multiple lip seal in slidable sealing contact with the piston rod 13. The radially intermediate portion 71 between the innermost and outermost portions 67 and 69 is flexible to allow axial movement of the innermost portion 69 away from a position pressed against the cap 60 by the pressure of the oil firstly to the position shown on the left hand side of FIGURE 7 when zero pressure differential acts on the seal element 16 and secondly to the position shown on the right hand side of FIGURE 7 when the oil pressure is less than that of atmospheric, and the seal assumes a generally concave configuration as viewed from the cap, whilst sealing is maintained between the piston rod 13 and the working chamber wall. Hence the sub-atmospheric pressure in the liquid adjacent the cap 60 is minimised or completely removed and the possibility of air being drawn into the working chamber 12 is correspondingly reduced with accompanying reduced risk of aeration of the oil.

In one modification (not shown) of the shock absorber shown in FIGURES 6 and 7, the seal element 16 is of generally concave form as viewed from the cap and is pressed against the cap 60 when the liquid pressure is above atmospheric. Sub-atmospheric liquid pressure causes the seal element 16 to adopt a configuration of greater concavity.

Figure 8:
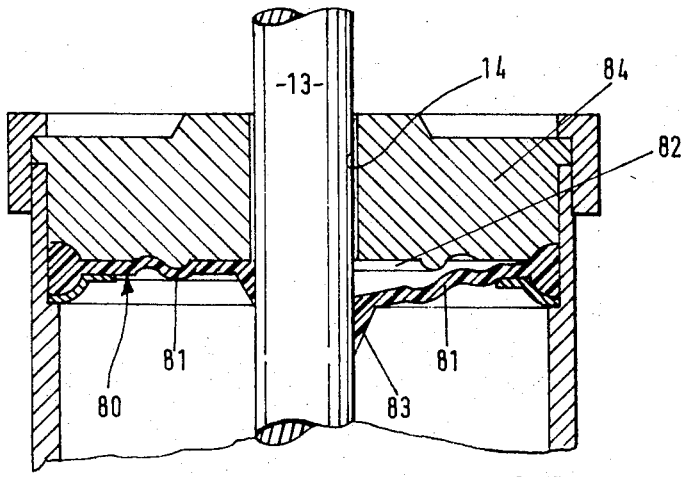

Referring to FIGURE 8, the seal element 80 is mounted in position in the same way as the element 16 of FIGURE 7 but the radially intermediate portion 81 is of convoluted form, and the inside cap surface 82 is of complementary shape to support evenly the seal element 80 when pressed thereagainst by liquid pressure. Air pressure is transmitted to the element 80 through the enlarged guide aperture 14. With appreciable sub-atmospheric liquid pressure, the innermost portion 83 of the element 80 moves axially away from the cap 84, i.e. from the position shown on the left hand side of FIGURE 8 to that of the right hand side, the intermediate portion 81 expanding in bellows-fashion. The amount of sub-atmospheric pressure which can be fully absorbed by the seal element 80 is greater than that for the seal element 16 for given diameters of working chamber 12 and piston rod 13.

Figure 9:
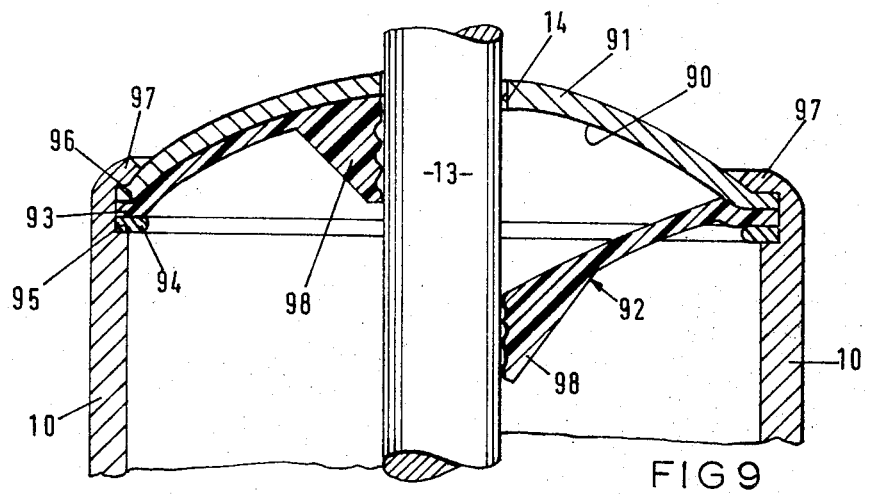

Referring to FIGURE 9, in this modification the inside surface 90 of the cap 91 is concave and, in the absence of sub-atmospheric liquid pressure, the seal element 92 is of complementary convex configuration as show on the left hand side of FIGURE 9. Also the radially outermost portion 93 of the seal element 92 is trapped between a rigid washer 94 seated on a shoulder 95 on the wall of the working chamber 12 and a radial flange 96 of the cap 91 retained by an inturned lip 97 of the body 10. With increasing sub-atmospheric liquid pressure the radially innermost portion 98 of the seal 92 moves axially away from the cap 91 into and through an aligned disposition in relation to the outermost portion 93 to reach a concave configuration as viewed from the cap, and as shown on the right hand side of FIGURE 9. This modification, for given diameters of the working chamber 12 and the piston rod 13, is also able to accommodate greater sub-atmospheric pressure than that shown in FIGURE 7.

In a further modification (not shown) atmospheric pressure is enabled to act on the surface of the seal element adjacent the cap by constructing the cap from an air pervious material.

It is to be understood that, unless otherwise required by the description, the term "cap" as used in this specification includes constructions wherein the cap is fitted either within or over the end of the body receiving the piston rod.

I claim:

1. A single tube shock absorber comprising a body having a cylindrical internal wall defining a cylindrical working chamber for a liquid damping medium, a cap mounted on said body to close one end of said chamber, a piston in axial sliding engagement with the cylindrical wall of said working chamber, a piston rod fixed to the piston and extending through an aperture in said cap, an annular seal element disposed within the working chamber between the piston and said cap adjacent the cap, said seal element having a radially outermost surface in sealing engagement with said cylindrical wall of the working chamber and a radially innermost surface in axial sliding sealing engagement with the piston rod to create a liquid tight seal between the body and piston rod, and means providing a recuperation chamber in communication with the working chamber on the opposite side of the piston from said seal through a valve permitting liquid medium displaced by the piston to pass into the recuperation chamber at a restricted rate and permitting comparatively free return of the liquid from the recuperation chamber to the working chamber; characterized in that the radially outermost surface of said seal element has axially inwardly unlimited sliding engagement with the same uninterrupted cylindrical wall as said piston and means is provided for introducing atmospheric pressure into said body to act on the axially outermost portion of said seal element to cause the entire seal element to slide axially inwardly within the working chamber when liquid pressure within the working chamber is less than atmospheric pressure.

2. A shock absorber according to claim 1 wherein said means for introducing atmospheric pressure to act on said seal element comprises a passage through said cap to the axially outermost surface of said seal element.

3. A shock absorber according to claim 1, wherein the cap is fixed in position relative to the body of the shock absorber.

4. A shock absorber according to claim 1, wherein the portion of the seal element intermediate the radially innermost and radially outermost portions of the seal element is flexible between flat and concave configurations as viewed from the cap.

5. A shock absorber according to claim 1, wherein the portion of the seal element intermediate the radially innermost and radially outermost portions of the seal element is flexible between convex and concave configurations as viewed from the cap.

6. A shock absorber according to claim 1, wherein the portion of the seal element intermediate the radially innermost and radially outermost portions of the seal element is convoluted.

7. A shock absorber according to claim 1, wherein the cap is slidable within the working chamber with its axially outer surface exposed to atmosphere through an opening in the body for transmitting atmospheric pressure to the seal element.

8. A shock absorber according to claim 1, wherein the means for introducing atmospheric pressure to act on the seal element comprises at least one port through the cap opening into a groove formed in the face of the cap presented to the seal element.

9. A shock absorber according to claim 1, wherein said means for introducing atmospheric pressure to act on the seal element comprises an enlargement to said aperture through the cap.

10. A shock absorber according to claim 1, wherein the means for introducing atmospheric pressure to act on the seal element comprises at least one groove extending across the radially outermost surface of the cap.

11. A shock absorber according to claim 1, wherein the radially innermost portion of the seal element comprises a plurality of annular sealing lips resiliently pressed against and surrounding the piston rod.

12. A shock absorber according to claim 1, wherein the radially innermost portion of the seal element comprises a single annular sealing lip resiliently pressed against and surrounding the piston rod.

13. A shock absorber according to claim 1 wherein the seal element is provided with a portion projecting into the working chamber for cushioning extreme withdrawal of the piston rod by abutment with the piston.

14. A shock absorber according to claim 7 wherein movement of the cap under the action of the pressure of said liquid medium in the working chamber is cushioned by an O-ring seated beneath an inturned flange from the body.

15. A shock absorber according to claim 1 wherein the radially outermost surface of the seal element extends between the tips of two tapering and axially etxending opposite flanges, is naturally concave in section, and is substantially flattened by the inner surface of the body.

References Cited
UNITED STATES PATENTS

| | | | |
|---|---|---|---|
| 2,662,615 | 12/1953 | Armstrong | 188—100 |
| 2,753,957 | 7/1956 | Dillenburger et al. | 188—100 X |
| 2,793,889 | 5/1957 | Potter, Jr. | 188—100 |
| 2,906,377 | 9/1959 | Peras | 188—100 |
| 3,139,159 | 6/1964 | Lob | 188—100 |

FOREIGN PATENTS

| | | |
|---|---|---|
| 1,322,034 | 2/1963 | France. |

FERGUS S. MIDDLETON, *Primary Examiner.*

MILTON BUCHLER, *Examiner.*

G. E. HALVOSA, *Assistant Examiner.*